United States Patent
Okabe et al.

(10) Patent No.: US 9,821,498 B2
(45) Date of Patent: Nov. 21, 2017

(54) INJECTION MOLDING METHOD AND INJECTION MOLDING DEVICE

(71) Applicants: U-MHI PLATECH CO., LTD., Nagoya-shi, Aichi (JP); MITSUBISHI HEAVY INDUSTRIES, LTD., Tokyo (JP)

(72) Inventors: Ryoji Okabe, Tokyo (JP); Toshihiko Kariya, Aichi (JP); Naoki Toda, Aichi (JP); Munehiro Nobuta, Aichi (JP)

(73) Assignees: U-MHI PLATECH CO., LTD., Aichi (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 78 days.

(21) Appl. No.: 14/758,518

(22) PCT Filed: Mar. 25, 2013

(86) PCT No.: PCT/JP2013/001998
§ 371 (c)(1),
(2) Date: Jun. 29, 2015

(87) PCT Pub. No.: WO2014/155409
PCT Pub. Date: Oct. 2, 2014

(65) Prior Publication Data
US 2016/0001477 A1    Jan. 7, 2016

(51) Int. Cl.
*B29C 45/18* (2006.01)
*B29C 45/50* (2006.01)
(Continued)

(52) U.S. Cl.
CPC ...... *B29C 45/0005* (2013.01); *B29C 45/1816* (2013.01); *B29C 45/50* (2013.01);
(Continued)

(58) Field of Classification Search
CPC ............ B29C 2945/76605; B29C 2945/76859
See application file for complete search history.

(56) References Cited

U.S. PATENT DOCUMENTS

2005/0161847 A1  7/2005  Weatherall et al.
2011/0272847 A1  11/2011  Hehl

FOREIGN PATENT DOCUMENTS

DE    102007020612 A1    11/2008
JP        1-176540 A      7/1989
(Continued)

OTHER PUBLICATIONS

International Search Report for PCT/JP2013/001998 dated Jun. 11, 2013.
(Continued)

*Primary Examiner* — Jill Heitbrink
(74) *Attorney, Agent, or Firm* — Kanesaka Berner and Partners LLP (57) ABSTRACT

In an injection molding method, using a heating cylinder having on the front end thereof a discharge nozzle, a single axis screw is rotatable inside the heating cylinder, a fiber-supplying device fills reinforcing fiber into the heating cylinder, and injection molding is performed while supplying the reinforcing fiber and the resin starting material separately and supplying the reinforcing fiber on the front side of the resin starting material. The method includes a plasticization process for obtaining a specified amount of a kneaded product by retracting the screw while rotating in the normal direction to melt the resin starting material and knead reinforcing fiber into the melted resin starting material, and an injection process for discharging the kneaded product from the discharge nozzle by advancing the screw. Reinforcing fiber is supplied into the heating cylinder in the injection process.

4 Claims, 7 Drawing Sheets

(51) Int. Cl.
    *B29C 45/60*    (2006.01)
    *B29C 45/00*    (2006.01)
    *B29C 45/62*    (2006.01)
    *B29C 45/76*    (2006.01)
    *B29K 101/00*   (2006.01)
    *B29K 105/12*   (2006.01)

(52) U.S. Cl.
    CPC .............. *B29C 45/60* (2013.01); *B29C 45/62* (2013.01); *B29C 45/76* (2013.01); *B29C 2945/76605* (2013.01); *B29C 2945/76665* (2013.01); *B29C 2945/76832* (2013.01); *B29C 2945/76859* (2013.01); *B29K 2101/00* (2013.01); *B29K 2105/12* (2013.01)

(56) References Cited

FOREIGN PATENT DOCUMENTS

| | | |
|---|---|---|
| JP | 2-153714 A | 6/1990 |
| JP | 3-76614 A | 4/1991 |
| JP | 4-156320 A | 5/1992 |
| JP | 8-103921 A | 4/1996 |
| JP | 10-71630 A | 3/1998 |
| JP | 2001-30316 A | 2/2001 |
| JP | 2012-56173 A | 3/2012 |
| JP | 2012-511445 A | 5/2012 |
| JP | 5095025 B1 | 12/2012 |

OTHER PUBLICATIONS

Office Action in CN Application No. 201380063795.4, dated Apr. 25, 2016.
Extended European Search Report in EP Application No. 13880290.5, dated Oct. 27, 2016.

INJECTION MOLDING METHOD AND INJECTION MOLDING DEVICE

RELATED APPLICATIONS

The present application is a National Phase of International Application Number PCT/JP2013/001998, filed Mar. 25, 2013.

TECHNICAL FIELD

The present invention relates to an injection molding method for a resin containing reinforcing fiber.

BACKGROUND ART

A molded product of a fiber-reinforced resin, which is increased in strength by including reinforcing fiber, is used for various applications. In order to obtain the molded product by injection molding, a thermoplastic resin is melted by rotating a screw in a cylinder which is a plasticizing device and is kneaded with fiber, and thereafter the resultant is injected into the die of an injection molding device.

In order to obtain an effect of enhancing strength using reinforcing fiber, it is desirable that the reinforcing fiber is uniformly dispersed in a resin. In order to accomplish the uniform dispersion, strict kneading conditions may be employed. However, this conversely causes an increase in shear force in the kneaded product and thus the reinforcing fiber may be cut. Accordingly, the fiber length after molding is significantly reduced compared to the original fiber length, and thus there is concern that the obtained fiber-reinforced resin molded product may not satisfy desired properties (PTL 1). Therefore, it is necessary to select injection molding conditions with which appropriate shear force is obtained during kneading.

In addition, in order to prevent the fiber from being cut in a plasticization process, a plasticizing device provided with a cylinder which includes a supply port for supplying a thermoplastic resin starting material to the cylinder, a supply port for supplying a fiber material, and a vent port for removing gas included in a resin, and a screw is suggested (PTL 2).

The cutting of fiber in the plasticization process of the fiber-reinforced resin is performed mainly in the first half of the plasticizing device, that is, in a supply unit or a compression unit of resin pellets, and thus the supply port of the fiber material in the plasticizing device is provided at a stage after the compression unit is used in which the thermoplastic resin is sufficiently melted.

CITATION LIST

Patent Literature

[PTL 1] Japanese Unexamined Patent Application Publication No. 2012-56173
[PTL 2] Japanese Unexamined Patent Application Publication No. H3-76614

SUMMARY OF INVENTION

Technical Problem

The inventors confirmed that the reinforcing fiber can be uniformly dispersed to a considerable degree by selecting the conditions for injection molding and the specification of the reinforcing fiber which is added. On the other hand, particularly similarly to the plasticizing device described in PTL 2, during molding using a cylinder which separately includes a supply port for supplying a thermoplastic resin starting material and a supply port for supplying a fiber material, and a screw, it was experienced that regions having a clearly lower reinforcing fiber content than the other regions where the reinforcing fiber is uniformly dispersed are generated at unspecified points of a fiber-reinforced resin molded product. When there are variations in the distribution of the reinforcing fiber content in a single molded product, points having low strength are locally generated, and thus there is concern that the molded product may not obtain the designed strength. In addition, there is concern that the degree of shrinkage of the resin during cooling and solidification may not be stabilized and molding defects such as large warpage or flaws may be generated.

The present invention provides an injection molding method for a resin material capable of preventing or suppressing variations in the reinforcing fiber content and obtaining stable molding quality.

Solution to Problem

The inventors examined the cause of generation of a region having a clearly low reinforcing fiber content, and as a result, found that the cause is related to an injection process after a thermoplastic resin is melted. That is, the injection process is a process of allowing a screw to advance while stopping the rotation of the screw to discharge a molten resin containing the reinforcing fiber to a die. Typically, the reinforcing fiber is supplied from a hopper provided in the upper portion of a cylinder which is a plasticizing device. However, since the rotation of the screw is stopped, the reinforcing fiber is moved toward the lower side of the groove between the flights of the screw by free fall due to its own weight. However, the reinforcing fiber is likely become entangled in the raw material hopper. In particular, when the fiber length is 2 mm or greater, the reinforcing fiber tends not to easily freely fall. When the fiber length is 4 mm or greater, if the reinforcing fiber fills the inside of the hopper, it is difficult for the reinforcing fiber to freely fall into the screw groove. Therefore, during the injection process in which the hopper hole is blocked by the flight which passes therethrough at a high velocity, the fiber cannot fall into the screw. In addition, even when the reinforcing fiber passes between the flights during passage at a high velocity and falls into the groove of the screw, since the molten resin adheres to the groove between the flights, the molten resin acts as resistance and it is not easy for the reinforcing fiber to move downward. Therefore, between the injection processes, a region having a low reinforcing fiber content is generated in the regions on the lower side of the groove between the flights.

The present invention that has been made is an injection molding method which includes a cylinder having a discharge nozzle formed on a front side thereof, a single axis screw provided to be rotatable in the cylinder, and a fiber-supplying device for filling the cylinder with reinforcing fiber, and performs injection molding while separately supplying the reinforcing fiber and a resin starting material and supplying the reinforcing fiber on a side closer to the front side than the resin starting material, the method including: a plasticization process of allowing the screw to retract while rotating the screw in a normal direction to melt the resin starting material and kneading the reinforcing fiber with the melted resin starting material, thereby obtaining a predetermined amount of a kneaded product; and an injection process of discharging the kneaded product from the discharge nozzle by allowing the screw to advance, in which the reinforcing fiber is supplied into the cylinder in the injection process.

In the present invention, the reinforcing fiber is supplied into the screw so that the reinforcing fiber enters the inside of the screw groove regardless of the state of the inside of the raw material hopper or the inside of the screw groove even in the injection process. Therefore, even in a case where the reinforcing fiber having a length of 2 mm or greater is supplied, a region of the screw groove having a low amount of reinforcing fiber can be reduced.

It is preferable that the screw is rotated in the normal direction or is rotated in a reverse direction in the injection process.

Since the screw is rotated in the normal direction or is rotated in a reverse direction in the injection process when the reinforcing fiber is supplied, the phase of the screw groove portion positioned on the lower side of the screw can be changed to oppose a vent hole. Accordingly, even when the resin adheres to the surface of the screw groove, the reinforcing fiber can fill the entire periphery of the screw. In addition, since the molten resin accumulated on the lower side can be transported by the rotation of the screw, gaps which are filled with the reinforcing fiber can be generated on the lower side of the screw, and thus the reinforcing fiber can be moved to the region on the lower side.

In the injection process of the present invention, in order to fill the entire periphery of the entire region of the screw groove which passes through the lower side of the vent hole through which the reinforcing fiber is supplied, with the fiber, it is effective to continuously fill the screw groove on the lower side of the vent hole with the reinforcing fiber. Here, as an injection molding method of the present invention, a first method and a second method which are described below are suggested.

It is preferable that the first method further includes a vent hole which penetrates through a body of the cylinder from an outer peripheral surface to an inner peripheral surface thereof in order to supply the reinforcing fiber from the side closer to the front side than the resin starting material, in which, in the injection process, a reverse rotational velocity of the screw is set so that movement of the flight of the screw in a projection region of the vent hole is equal to or smaller than one lead length of the flight.

This is because, when the flight in the projection region moves more than one lead length of the flight in the injection process, the inside of the screw groove does not oppose the vent hole and a region which is not filled with the reinforcing fiber is generated.

In addition, it is preferable that in the second method set, in the injection process, a retraction velocity of the screw and the reverse rotational velocity of the screw are set so that an angle θ2 of a progress velocity of a screw groove based on the reverse rotation of the screw coincides with a lead angle θ1 of the flight of the screw.

When the relative position of the flight of the screw in the projection region of the vent hole is not moved from the same position in the projection region, the screw is in a state of moving while rotating so that the entire periphery of the screw groove that passes though the lower side of the vent hole opposes the vent hole. Therefore, the region in the screw groove which is not filled with the reinforcing fiber can be eliminated.

In addition, it is also preferable that, in the injection process of the present invention, the screw is rotated in the reverse direction under the same condition as that of a rotation velocity of the screw in the plasticization process.

This is because simple control can be performed without increasing setting items related to the number of rotations of the screw.

It is needless to say that the preferable forms can be applied to the following injection molding device.

The present invention can also be recognized as an injection molding device including: a cylinder having a discharge nozzle formed on a front side thereof; a single axis screw provided to be rotatable in the cylinder; a fiber-supplying unit for filling the cylinder with reinforcing fiber; and a resin-supplying hopper which is provided closer to a rear side than the fiber-supplying unit and supplies a resin starting material into the cylinder.

The injection molding device performs a plasticization process of allowing the screw to retract while rotating the screw in a normal direction to melt a resin starting material and kneading the reinforcing fiber with the melted resin starting material, thereby obtaining a predetermined amount of a kneaded product, and an injection process of discharging the kneaded product from the discharge nozzle by allowing the screw to advance. However, the reinforcing fiber is supplied into the cylinder in the injection process.

Advantageous Effects of Invention

According to the present invention, the reinforcing fiber is supplied into the cylinder even in the injection process, and thus the region of the screw groove having a low amount of reinforcing fiber can be reduced. Therefore, according to the present invention, the generation of a region having a low reinforcing fiber content in the molded product can be prevented. Accordingly, stable molding quality can be obtained.

BRIEF DESCRIPTION OF DRAWINGS

FIGS. 2(a)-2(d) are views schematically illustrating molten states of a resin in the procedure of injection molding in the embodiment.

FIGS. 3(a)-3(c) are views schematically illustrating molten states of a resin in the procedure of injection molding in the related art.

FIGS. 4(a)-4(b) illustrate the injection molding according to the embodiment, FIG. 4(a) corresponds to FIG. 3(b), and FIG. 4(b) is a view illustrating a preferable progress velocity of a screw groove in the embodiment.

FIGS. 5(a)-5(b) illustrate the schematic configuration of a measuring unit of the embodiment.

DESCRIPTION OF EMBODIMENTS

Hereinafter, the present invention will be described in detail on the basis of the embodiments illustrated in the accompanying drawings.

First Embodiment

Figure 1:
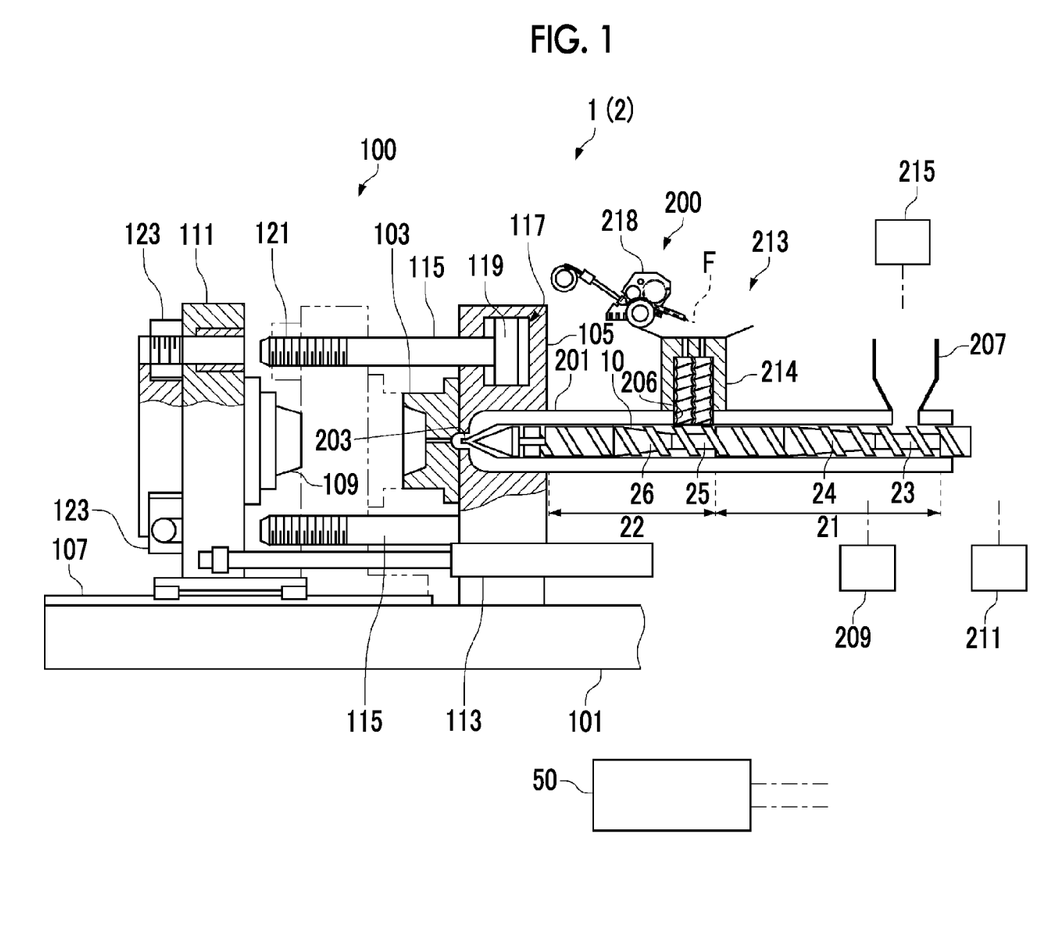
FIG. 1 is a view illustrating the configuration of an injection molding device according to an embodiment.

As illustrated in FIG. 1, an injection molding machine 1 according to this embodiment includes a die clamping unit 100, a plasticizing unit 200, and a controller 50 which controls the operations of the units.

The die clamping unit 100 includes a fixed die plate 105 which is fixed onto a base frame 101 and is provided with a fixed die 103 mounted thereon, a movable die plate 111 which moves in the right and left directions of the figure on a sliding member 107 such as a rail or a sliding plate by the operation of a hydraulic cylinder 113 and is provided with a movable die 109 mounted thereon, and a plurality of tie bars 115 which connect the fixed die plate 105 to the movable die plate 111. In the fixed die plate 105, a hydraulic cylinder 117 for die clamping is provided coaxially with each of the tie bars 115, and a ram 119 of the hydraulic cylinder 117 is connected to one end of each of the tie bars 115.

Each of the elements performs a necessary operation according to a command of the controller 50.

The basic operation of the die clamping unit 100 is as follows.

First, the movable die plate 111 is moved to a position indicated by a two-dot chain line in the figure by the operation of the hydraulic cylinder 113 for die opening and closing so as to allow the movable die 109 to abut the fixed die 103. Next, a male screw portion 121 of each of the tie bars 115 is engaged with a half nut 123 provided in the movable die plate 111 so as to fix the movable die plate 111 to the tie bars 115. In addition, the fixed die 103 and the movable die 109 are clamped together by increasing the pressure of an operating oil of an oil chamber on the movable die plate 111 side in the hydraulic cylinder 117. After performing the die clamping as described above, a molten resin M is injected into the cavity of the die from the plasticizing unit 200 to mold a molded product.

In addition, as described later, a screw 10 according to this embodiment is of a type in which thermoplastic resin pellets P and reinforcing fiber F are separately supplied in the longitudinal direction of the screw, and thus the overall length of the screw 10 or the overall length of the plasticizing unit 200 may be elongated. Therefore, in this embodiment, the die clamping unit 100 having the above-described configuration which can be installed even in a narrow space where a die clamping device of a toggle link type or a type provided with a die clamping cylinder at the rear surface of a movable die plate cannot be installed, and thus enables space saving, is described. However, the configuration of the die clamping unit 100 which is described here is only an example, and application or substitution of other configurations may not be prohibited. For example, although the hydraulic cylinder 113 is described as the actuator for die opening and closing in this embodiment, the actuator for die opening and closing may be substituted with a combination of a member which converts rotary motion into linear motion such as a ball screw or a rack and pinion, and an electric motor such as a servomotor or an induction motor. In addition, it is needless to say that the actuator may also be substituted with a toggle link type die clamping unit which is electrically driven or hydraulically driven.

The plasticizing unit 200 includes a cylindrical heating cylinder 201, a discharge nozzle 203 provided on the front side of the heating cylinder 201, the screw 10 provided in the heating cylinder 201, a fiber-supplying device 213 which supplies the reinforcing fiber F, and a resin-supplying hopper 207 which supplies the resin pellets P. The fiber-supplying device 213 is connected to a vent hole 206 provided closer to the front side than the resin-supplying hopper 207. In addition, the screw 10 employs a two-stage type design similarly to a so-called gas vent type screw. Specifically, a design having a first stage 21 which includes a supply unit 23 and a compression unit 24 on the rear side of the screw 10 and a second stage 22 which includes a supply unit 25 and a compression unit 26 connected to the first stage 21 is employed. A resin is melted in the first stage 21 (molten resin M), and the molten resin M and the reinforcing fiber F are mixed and dispersed in the second stage 22. The pressure of the molten resin M in the heating cylinder 201, which becomes a high pressure due to the compression at the end portion (front end) of the first stage 21, is reduced by connecting the supply unit 25 which is a deep groove portion of the second stage 22 to the end (front end) of the first stage 21 directly or indirectly via a throttle flow passage in order to supply the reinforcing fiber F. In addition, the plasticizing unit 200 includes a first electric motor 209 which causes the screw 10 to advance or retract, a second electric motor 211 which causes the screw 10 to rotate in the normal direction or rotate in the reverse direction, and a pellet-supplying device 215 which supplies the resin pellets P to the resin-supplying hopper 207. Each of the elements performs a necessary operation according to a command of the controller 50. In addition, in the plasticizing unit 200, the side to which the molten resin M is injected is referred to as the front, and the side to which raw materials (reinforcing fiber and resin pellets) are supplied is referred to as the rear.

The basic operation of the plasticizing unit 200 is as follows.

When the screw 10 provided in the heating cylinder 201 is rotated, the reinforcing fiber F supplied from the fiber-supplying device 213 via the vent hole 206 and the pellets (resin pellets P) which are made of a thermoplastic resin and are supplied from the resin-supplying hopper 207 are transported to the discharge nozzle 203 side on the front side of the heating cylinder 201. In this process, the resin pellets P (molten resin M) which are heated by the transporting portion and start to gradually melt are kneaded with the reinforcing fiber F, and thereafter a predetermined amount of the resultant is injected into the cavity which is formed between the fixed die 103 and the movable die 109 of the die clamping unit 100. In addition, it is needless to say that the basic operation of the screw 10, in which the screw 10 retracts while receiving back pressure as the resin pellets P melt and thereafter advances to perform injection, is performed. In addition, on the outside of the heating cylinder 201, a heater may also be provided to melt the resin pellets P. Likewise, application or substitution of other configurations may not be prohibited.

The injection molding machine 1 including the above-described elements performs injection molding in the following order.

As is well known, injection molding includes a clamping process of closing and clamping the movable die 109 and the fixed die 103 with high pressure, a plasticization process of heating and melting the resin pellets P in the heating cylinder 201 to be plasticized, an injection process of injecting the plasticized molten resin M into the cavity formed by the movable die 109 and the fixed die 103 to fill the cavity, a holding process of cooling the molten resin M filling the cavity until the molten resin M solidifies, a die opening process of opening the dies, and an ejecting process of ejecting a molded product which is cooled and solidified in the cavity. The above-described processes are sequentially performed or some of the processes are performed in parallel, thereby completing one cycle.

Next, the plasticization process and the injection process according to this embodiment will be described.

Figure 2A:
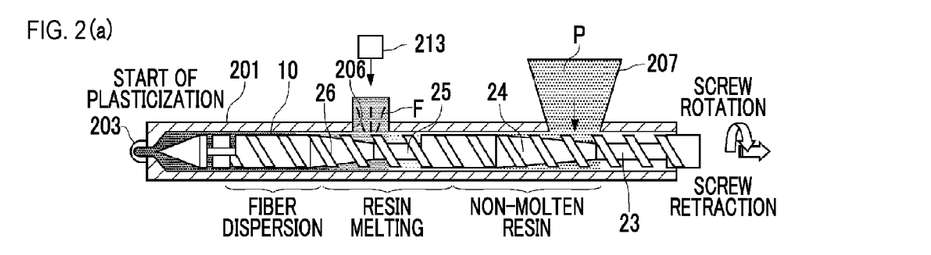
FIG. 2(a) illustrates an initial stage of the start of plasticization.

In the plasticization process, the resin pellets P are supplied from the resin-supplying hopper 207 on the rear side of the heating cylinder 201. In the initial stage of the start of plasticization, the screw 10 is positioned on the front side of the heating cylinder 201, and retracts from the initial position while the screw 10 rotates ("start of plasticization" in FIG. 2(a)). As the screw 10 rotates, the resin pellets P supplied to a gap between the screw 10 and the heating cylinder 201 are heated while receiving shear force, are gradually melted, and are transported toward the front side. In addition, in the present invention, the rotation (direction) of the screw 10 in the plasticization process is specified as rotation in the normal direction. When the molten resin M is transported to the fiber-supplying device 213, the reinforcing fiber F is supplied from the fiber-supplying device 213. As the screw 10 rotates, the reinforcing fiber F is kneaded with the molten resin M to be dispersed therein, and is transported toward the front side along with the molten resin M. When the resin pellets P and the reinforcing fiber F are continuously supplied and the screw 10 continuously rotates, the screw 10 is transported to the front side of the heating cylinder 201, and thus the molten resin M is discharged from the screw and is accumulated on the front side of the screw 10. The screw 10 is retracted by the balance between the resin pressure of the molten resin M accumulated on the front side of the screw 10 and the back pressure which suppresses the retraction of the screw 10. When a necessary amount of molten resin M is accumulated, the rotation and the retraction of the screw 10 are stopped ("plasticization completion" in FIG. 2(b)).

In FIGS. 2(a)-2(d), the states of the resin (the resin pellets P and the molten resin M) and the reinforcing fiber F are schematically illustrated by being divided into four stages of "non-molten resin", "resin melting", "fiber dispersion", and "fiber dispersion completion". In the stage of "plasticization completion", "fiber dispersion completion" on the front side of the screw 10 indicates a state where the reinforcing fiber F is dispersed in the molten resin M and is prepared for injection, and "fiber dispersion" indicates a state where the supplied reinforcing fiber F is dispersed in the molten resin M as the screw 10 rotates. In addition, "resin melting" indicates that the resin pellets P gradually melt while receiving shear force, and "non-molten resin" indicates that the resin pellets P receive the shear force but are not melted yet.

Figure 2B:
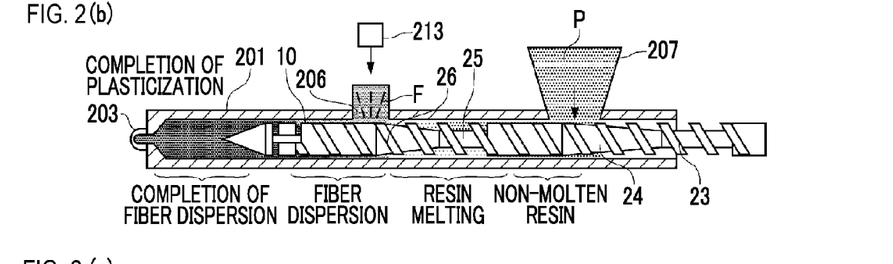
FIG. 2(b) illustrates completion of plasticization.

When the plasticization process is completed, the resin melting region illustrated in FIG. 2(b) is closer to the rear side than the fiber-supplying device 213 which supplies the reinforcing fiber F, and thus the groove of the screw 10 in this region is in a state where the reinforcing fiber F is not supplied thereto.

Figure 2C:
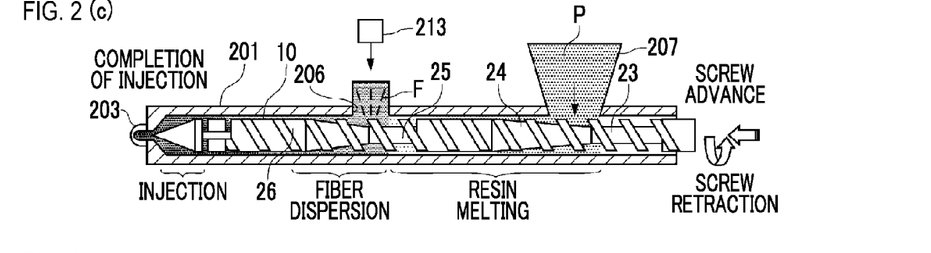
FIG. 2(c) illustrates completion of injection.

In the injection process, as illustrated in FIG. 2(C), the screw 10 is allowed to advance. In this case, a check valve (not illustrated) which is provided in the tip end portion of the screw 10 is closed such that the pressure (resin pressure) of the molten resin M accumulated on the front side of the screw 10 is increased, and thus the molten resin M is discharged from the discharge nozzle 203 toward the cavity.

In this embodiment, even in the injection process, the reinforcing fiber F is supplied into the heating cylinder 201 by the fiber-supplying device 213. Hereinafter, this point will be described.

Figure 3:
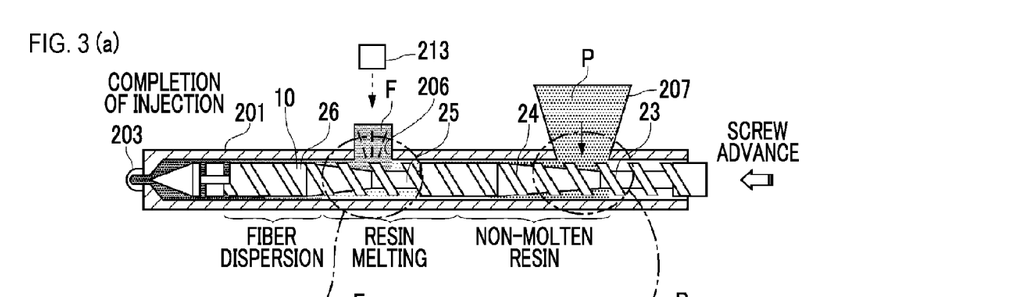
FIG. 3(a) illustrates completion of injection corresponding to FIG. 2(c)
FIG. 3(b) is a view illustrating a problem during the injection.
FIG. 3(c) illustrates the start of plasticization corresponding to FIG. 2(d).
Figure 3B:
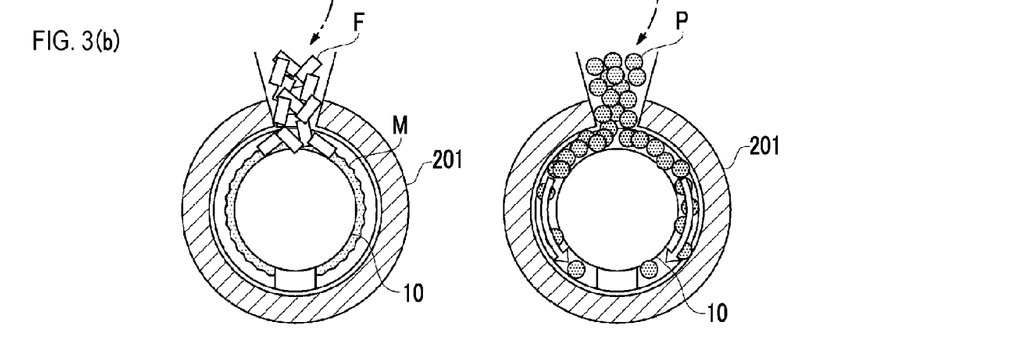

The screw 10 advances from the position in FIG. 2(b) to the position in FIG. 2(c) or the position in FIG. 3(a). At this time, the inside of the groove of the screw 10 in the resin melting region illustrated in FIG. 2(b) is not filled with the reinforcing fiber F. However, in the related art, the reinforcing fiber F is likely to become entangled in a raw material hopper mounted in the vent hole 206 which is an injection port, and thus the reinforcing fiber F cannot fill the screw 10 during the injection process in which the flights of the screw 10 that are lined up in the longitudinal direction intermittently pass though the vent hole 206 at a high velocity and thus substantially block the vent hole 206. In addition, even when the reinforcing fiber F passes between the flights that pass at a high velocity and falls into the groove of the screw 10, since the molten resin M adheres to the periphery of the screw 10, as illustrated in FIG. 3(b), the reinforcing fiber F supplied from the fiber-supplying device 213 sticks to the molten resin M. It is difficult for the supplied reinforcing fiber F to flow down the groove of the screw 10 and fill the lower side thereof while sticking to the upper portion of the screw 10. Otherwise, the molten resin M cannot be transported by the rotation of the screw, and the molten resin M in the groove of the screw 10 flows down to the lower side of the screw 10 by gravity and is accumulated between the lower side and the heating cylinder 201. Therefore, the supplied reinforcing fiber F is blocked by the molten resin M which flows down, and thus it is difficult for the reinforcing fiber F to fill the lower side of the screw 10. Accordingly, the screw 10 advances while the groove of the screw 10 in the resin melting region illustrated in FIG. 2(b) is not sufficiently filled with the reinforcing fiber F, and the resin melting region passes through the fiber-supplying device 213 and reaches the front side during the injection process. Therefore, as illustrated in FIG. 3(a), while the reinforcing fiber F is not contained in the molten resin M on the lower side of the heating cylinder 201, the injection process ends.

When the injection process ends and the plasticization is performed by the plasticizing unit 200 for the next molding cycle, as illustrated in FIG. 3(c), a portion N which does not contain the reinforcing fiber F is generated.

In addition, in a region to which the resin pellets P are supplied, this problem does not occur. In this region, the resin pellets P are not melted yet and the surface temperature of the screw 10 is sufficiently lower than a temperature at which the resin pellets P are melted. Therefore, the molten resin M is not present in the periphery of the screw 10 (on the right of FIG. 2(b)). Therefore, the resin pellets P can flow down to the groove of the screw 10, particularly to the lower side of the screw 10 under their own weight.

Figure 2D:
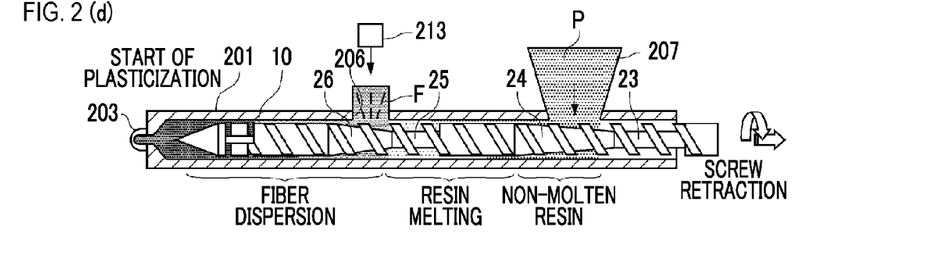
FIG. 2(d) illustrates the start of plasticization for the next cycle.

Contrary to this, when the reinforcing fiber F is supplied into the screw by the fiber-supplying device 213 during the injection process, the reinforcing fiber F can also be transported to the lower side of the heating cylinder 201. That is, although the flights of the screw 10 intermittently block the vent hole 206, or the molten resin M adheres to the entire periphery of the screw 10, or the molten resin M is accumulated on the lower side of the screw 10, a predetermined amount of the reinforcing fiber F supplied from the fiber-supplying device 213 fills the inside of the groove of the screw 10, and thus the reinforcing fiber F can spread out over the periphery of the screw 10. Therefore, as illustrated in FIG. 2(d), according to this embodiment, the region closer to the front side than the fiber-supplying device 213 fully contains the reinforcing fiber F. In addition, it is preferable that the supply of the reinforcing fiber F from the fiber-supplying device 213 during the injection process is performed over the entire period of the injection process. However, the supply may also be stopped only for a certain period by performing intermittent supply or the like, or the supply rate may also be changed continuously or in stages. In addition, in order to facilitate stable molding of quality products, the timing of the supply from the fiber-supplying device 213 and the supply amount may be controlled with high accuracy by using a timer (not illustrated) or various sensors such as a screw position sensor and rotary encoders provided in the first electric motor 209 and the second electric motor 211.

In addition, as the fiber-supplying device 213 which supplies the reinforcing fiber F into the heating cylinder 201, a metering feeder of a screw type, a piston type, or the like may be used. In this case, the fiber-supplying device 213 may be directly connected to the heating cylinder 201 to directly supply the reinforcing fiber F into the heating cylinder 201, or a fiber supply hopper 205 may be provided in the vent hole 206 to supply the reinforcing fiber F from the fiber-supplying device 213 to the fiber supply hopper 205.

In a case where the metering feeder is directly connected to the heating cylinder 201, the heating cylinder 201 can be forcibly filled with the reinforcing fiber F by the metering feeder. Therefore, even though the reinforcing fiber F is entangled in the vent hole 206, the inside of the groove of the screw 10 can be filled with a predetermined supply amount of the reinforcing fiber F. Accordingly, the amount (ratio) of the reinforcing fiber F which is mixed with the molten resin M in the groove of the screw 10 can be arbitrarily and easily controlled.

In a case of using the screw type metering feeder, a single axis type feeder having a single screw or a multiple axis type feeder having a plurality of screws may also be used. In order to set the ratio of the reinforcing fiber F mixed with the molten resin M to be a predetermined value, the multiple axis type feeder which has a strong transporting force to stably supply the reinforcing fiber F by measuring the reinforcing fiber F and thus can suppress a slip between the reinforcing fiber F and the feeder is preferable, and a two axis type feeder having a simple structure is particularly preferable in terms of cost, designability, and controllability.

Here, in this embodiment, as illustrated in FIG. 1, a two axis type screw feeder 214 is provided in the heating cylinder 201 to forcibly supply the reinforcing fiber F into the groove of the screw 10. In addition, even in a case of directly correcting a feeder to the heating cylinder 201, it is needless to say that there is no problem even when a single axis type screw feeder is used.

In addition, as a method of supplying the reinforcing fiber F to the two axis type screw feeder 214, continuous fiber, which is a so-called roving fiber may be directly injected into the two axis type screw feeder 214, or chopped fiber which is cut to a predetermined length in advance may also be injected thereinto.

In the case of injecting the chopped fiber, roving fiber may be transported to the vicinity of the fiber injection port of the metering feeder, and the roving fiber may be injected into the metering feeder immediately after being cut in the vicinity of the fiber injection port. Accordingly, the chopped fiber which is likely to scatter is not exposed until the chopped fiber is injected into the molding machine, and thus workability can be enhanced.

In this embodiment, a roving cutter 218 is provided in the vicinity of the fiber injection port of the two axis type screw feeder 214. The roving fiber is cut into the chopped fiber by the roving cutter 218 and the chopped fiber is supplied to the two axis type screw feeder 214.

In addition, as the roving cutter 218, a rotary cuter which rotates toward the two axis type screw feeder 214 is used. Accordingly, the chopped fiber which is cut can be directly injected into a screw groove of the two axis type screw feeder 214 by using the rotational force of the cutter without a storage member of the reinforcing fiber F such as a hopper. As a result, the chopped fiber which is immediately cut and is not significantly entangled can be injected into the two axis type screw feeder 214. Therefore, the chopped fiber can be efficiently fed into the two axis type screw feeder 214, and the chopped fiber can be stably supplied from the two axis type screw feeder 214 into the groove of the screw 10.

In addition, in the case of using the screw type metering feeder in the multiple axis type feeder, so-called two axis extrusion molding machine type feeder screws in which the flights and the grooves of the screws are engaged with each other, or feeder screws which are separated from each other by partition walls or are separated from each other so as not to interfere with each other although partition walls are not used may be used. In a case of using the two axis extrusion molding machine type feeder screws, the rotational directions of the screws may be the same or may be different from each other.

Figure 7A:
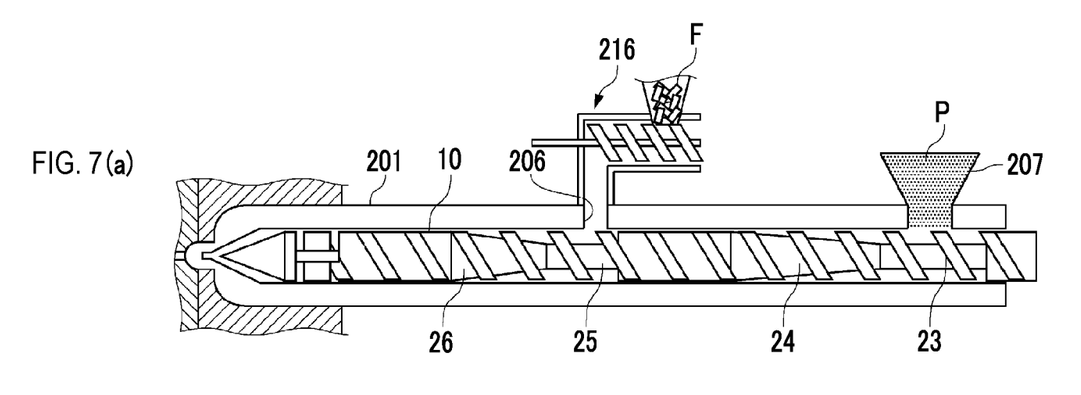
FIGS. 7(a)-7(b) are views illustrating an example of a plasticizing unit according to the embodiment.

In addition, as illustrated in FIG. 7(*a*), a single axis type screw feeder 216 may be provided to communicate with the vent hole 206 so as to supply the reinforcing fiber F. The reinforcing fiber F is forcibly supplied into the groove of the screw 10 also by the single axis type screw feeder 216.

Next, in a case where the reinforcing fiber F is forcibly supplied into the groove of the screw 10 as described above, an example of a method of determining the supply amount of the reinforcing fiber F which is supplied from the two axis type screw feeder 214 or the single axis type screw feeder 216 during the injection process will be described.

In a first step, the retraction velocity of the screw 10 in the plasticization process is calculated from position change information of the screw 10 detected by a screw position sensor (not illustrated).

In a second step, the ratio of the advance velocity of the screw in the injection process to the retraction velocity of the screw 10 calculated in the first step is calculated. In a case where the velocity in the injection process is controlled in multiple stages, the ratio of each of the velocities to the retraction velocity of the screw 10 in the plasticization process which is calculated in the first step is calculated.

In a third step, by multiplying the ratio in the velocity of the screw 10 between the plasticization process and the injection process which is calculated in the second step by the supply amount or the supply velocity of the reinforcing fiber F supplied from the two axis type screw feeder 214 or the single axis type screw feeder 216 during the plasticization process, which is set in advance to allow the molded product to have a desired fiber content, the reference value of the supply amount or the supply velocity of the reinforcing fiber F supplied from the two axis type screw feeder 214 or the single axis type screw feeder 216 in the injection process is calculated.

In a fourth step, by multiplying the reference value of the supply amount or the supply velocity of the reinforcing fiber F supplied from the two axis type screw feeder 214 or the single axis type screw feeder 216 in the injection process, which is calculated in the third step, by a correction factor, the operation condition value of the supply amount of the reinforcing fiber F supplied from the two axis type screw feeder 214 or the single axis type screw feeder 216 during the injection process is determined. In a case where the velocity in the injection process is controlled in multiple stages, the operation condition value of the supply amount of the reinforcing fiber F is determined by multiplying each of the velocities by the correction factor, and the supply amount of the reinforcing fiber F supplied from the feeder is changed whenever the injection velocity is changed. In addition, the correction factor may be theoretically obtained, and may also be experimentally obtained. In addition, in a case where the velocity in the injection process is controlled in multiple stages, the correction factor may be individually set for each of the velocities, and may be the same value.

In addition, regarding the supply amount of the reinforcing fiber F supplied from the two axis type screw feeder 214 or the single axis type screw feeder 216, variations in the content distribution of the reinforcing fiber in the molded product are obtained by experiment, and the operation condition value of the supply amount of the reinforcing fiber F supplied from the two axis type screw feeder 214 to the screw 10 during the injection process may be determined so that variations in the content distribution of the reinforcing fiber in the molded product are in a desired content acceptance range on the basis of the experimental results.

In addition, a method of determining the supply amount of the reinforcing fiber F supplied from the two axis type screw feeder 214 or the single axis type screw feeder 216 during the injection process may be selected from the above-described determination methods or may be appropriately changed to another method without departing from the gist of the present invention.

Figure 7B:
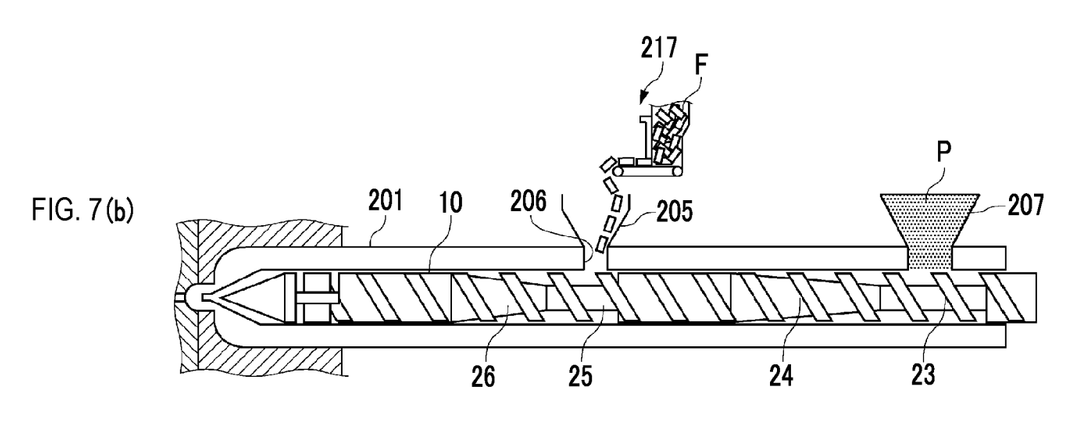

On the other hand, in a case of using the fiber supply hopper 205, as the fiber-supplying device 213, for example, as illustrated in FIG. 7(b), a belt feeder 217 may be used. Only a predetermined amount of the reinforcing fiber F can be supplied to the fiber supply hopper 205 by controlling the transportation velocity of the belt feeder 217 (FIG. 7(b)).

Here, in a case where the reinforcing fiber F is supplied from the fiber-supplying device 213 to the fiber supply hopper 205, the supply amount of the reinforcing fiber F is limited to a degree of supply amount at which the reinforcing fiber F does not become entangled in the vent hole 206, specifically to an amount at which the vent hole 206 is not fully filled, such that the screw 10 can be filled with the reinforcing fiber F without blocking the inside of the vent hole 206. Accordingly, the reinforcing fiber F can be supplied into the groove of the screw 10 without a burden on the reinforcing fiber F, and thus damage to the fiber before being inserted into the groove of the screw 10 can be suppressed.

Second Embodiment

In this embodiment, in order to further smoothly supply the reinforcing fiber F by using the injection molding machine 1 of the first embodiment, the screw 10 is rotated in the reverse direction between the injection processes. Differences from the first embodiment will be mainly described.

In the related art, the rotation of the screw 10 is stopped between the injection processes. However, there may be a case where the reinforcing fiber F is not smoothly supplied. That is, even when the fiber-supplying device 213 described in the first embodiment is used, in a case where the supply force of the fiber-supplying device 213 is small, or the like, the reinforcing fiber F cannot overcome the resin resistance in the groove of the screw 10 and thus cannot fill the lower side of the screw 10 between the injection processes.

Figure 4:
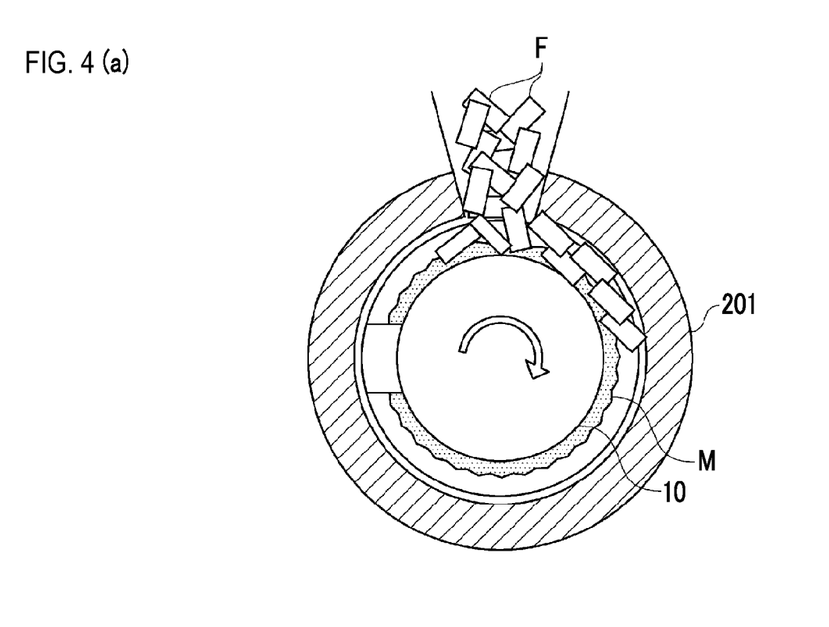

Contrary to this, according to this embodiment in which the screw 10 is rotated in the reverse direction during the injection process, as illustrated in FIG. 4(a), by rotating the screw 10 in the reverse direction, the reinforcing fiber F which sticks to the molten resin M is also transported toward the lower side of the heating cylinder 201 while being pushed into the groove of the screw 10. Otherwise, by rotating the screw 10, the molten resin M accumulated on the lower side of the screw 10 is transported into the groove of the screw 10, and thus a gap into which the reinforcing fiber F infiltrates is formed in the groove on the lower side of the screw 10. Therefore, the reinforcing fiber F is allowed to spread out over the periphery of the screw 10 by rotating the screw 10 in the reverse direction while the screw 10 advances. It can be said that during this process, the reinforcing fiber F is kneaded with the molten resin M. Therefore, according to this embodiment, the region closer to the front side than the fiber-supplying device 213 fully contains the reinforcing fiber F. In addition, it is preferable that the rotation of the screw 10 during the injection process is performed over the entire period of the injection process. However, the rotation may also be stopped for only a certain period of time by performing intermittent reverse rotation or the like, and reverse rotation and normal rotation may be alternately performed, or the rotational velocity may be changed continuously or in stages. In addition, in order to facilitate stable molding of quality products, the rotation timing and velocity of the of the reverse rotation of the screw 10 may be controlled with high accuracy by using a timer (not illustrated) or various sensors such as a screw position sensor and rotary encoders provided in the first electric motor 209 and the second electric motor 211.

Preferable conditions for the reverse rotation of the screw 10 are as follows. In addition, in order to realize the preferable conditions, the controller 50 may control the first electric motor 209 which allows the screw 10 to advance or retract and the second electric motor 211 which allows the screw 10 to rotate in the normal direction or rotate in the reverse direction, in a synchronous manner.

In a case where the screw 10 is rotated in the reverse direction, a velocity at which the screw 10 advances (advance velocity) is represented by V1, and a velocity at which the screw 10 rotates in the reverse direction (rotational velocity) is represented by V2. In addition, the lead angle of a flight 11 of the screw 10 is represented by θ1. In this case, as illustrated in FIG. 4(b), it is preferable that an angle θ2 of a progress velocity V3 of the screw groove which is specified by the advance velocity V1 and the rotational velocity V2 coincides with the lead angle θ1. When this condition is satisfied, a relative position of the flight 11 to the vent hole 206 to which the reinforcing fiber F is supplied from the fiber-supplying device 213 (or the position of the flight 11 when viewed from the vent hole 206) is allowed to be constant. Accordingly, the reinforcing fiber F can be evenly and continuously pushed into the groove of the screw 10.

The advance velocity V1 and the rotational velocity V2 can be specified as follows, and since the lead angle θ1 is known, preferable conditions can be set by adjusting the advance velocity V1 and the rotational velocity V2.

D=the outer diameter (mm) of the screw 10
aD=the lead size (mm) of the flight 11 of the screw 10
nD=injection stroke (mm)
injection time=t (sec)

By applying this, tan θ1=aD/πD and tan θ2=V1/V2 are satisfied, and thus a reverse rotational velocity V20 at which θ1=θ2 is satisfied becomes V20=πV1/a.

As another preferable condition, when the progress velocity of the screw groove during the plasticization process is represented by V4, the magnitude of the progress velocity V3 of the screw groove may be equal to that of the progress velocity V4, and the direction thereof may be reversed (reversed by 180°). Accordingly, the same amount of the reinforcing fiber F as that which is supplied to the screw groove in the plasticization process can be supplied.

In addition, in the injection process in which the screw 10 advances at a high velocity, in order to control the advance velocity V1 and the rotational velocity V2 of the screw 10 to satisfy θ1=θ2, a highly accurate drive control system such as an electric servomotor is needed. However, in an injection molding machine which does not include a highly accurate drive control system, such as a hydraulic drive system, rotation may be controlled by using the reverse rotational velocity of the screw 10 so as not to allow the flight 11 of the screw 10 in a projection region of the vent hole 206, that is, when viewed from the vent hole 206, to move more than one lead length of the flight 11 during the injection process.

The reverse rotational velocity of the screw 10 at which the flight 11 of the screw 10 when viewed from the vent hole 206 is not allowed to move more than one lead length of the flight 11 during the injection process as the screw 10 rotates in the reverse direction can be obtained as follows.

A time t0 for the advance of the screw 10 by one lead of the flight 11 at the advance velocity V1 is represented by t0=aD/V1.

A reverse rotational velocity at which the position of the flight 11 of the screw 10 when viewed from the vent hole 206 is considered to be unchanged during the time t0 is a velocity at which the screw makes one revolution during the time t0. In addition, this is a velocity that satisfies θ1=θ2, that is, V20.

When the screw 10 makes two revolutions during the time t0, the flight 11 of the screw 10 when viewed from the vent hole 206 is considered to move rearward by one lead length of the flight 11 in the injection process.

Therefore, a reverse rotational velocity V21 at which the screw makes two revolutions during the time t0 is represented by V21=2×V20.

In addition, when the screw 10 makes only half a revolution during the time t0, the flight 11 of the screw 10 when viewed from the vent hole 206 is considered to move forward by one lead length of the flight 11 in the injection process.

Therefore, a reverse rotational velocity V22 at which the screw 10 makes half a revolution during the time t0 is represented by V22=V20/2.

Therefore, the range of the reverse rotational velocity of the screw 10, in which the amount of movement of the flight 11 during the injection process of the flight 11 of the screw 10 when viewed from the vent hole 206 is considered to be equal to or smaller than one lead length, is equal to or greater than the reverse rotational velocity at which the screw makes half a revolution during the time t0, and is equal to or smaller than the reverse rotational velocity at which the screw 10 makes two revolutions during the time t0.

Accordingly, the range of the rotational velocity V2 of the screw 10 in which the amount of movement of the flight 11 of the screw 10 when viewed from the vent hole 206 during the injection process is equal to or smaller than one lead length is V21=V20/2≤V2≤V22=2×V20.

Therefore, by performing operations in a range of πV1/2a≤V2≤2πV1/a, the screw groove which passes through the lower side of the vent hole 206 can oppose the vent hole 206 as a continuous groove, and thus the generation of a region which is not filled with the reinforcing fiber F can be prevented or suppressed.

In addition, when a negative pressure generating device such as a vacuum pump is allowed to communicate with the vent hole 206 and the inside of the vent hole 206 is allowed to have a negative pressure, external air which infiltrates into the cylinder along with the reinforcing fiber F or gas which is volatilized from a resin or an additive of the resin is discharged to the outside of the cylinder. Therefore, molding defects such as silver streaks, voids, and black spot foreign matter due to oxidative degradation of the resin or contamination of the dies can be prevented. In addition, in order to discharge the external air which infiltrates into the cylinder along with the reinforcing fiber F or the gas which is volatilized from the resin or the additive of the resin, to the outside of the cylinder, a through-hole which penetrates the cylinder from the outer peripheral surface to the inner peripheral surface thereof may be provided closer to the front side than the vent hole 206 which supplies the reinforcing fiber F.

Third Embodiment

In this embodiment, in an injection molding machine 2, the fiber content C is measured during the plasticization process.

Figure 5:
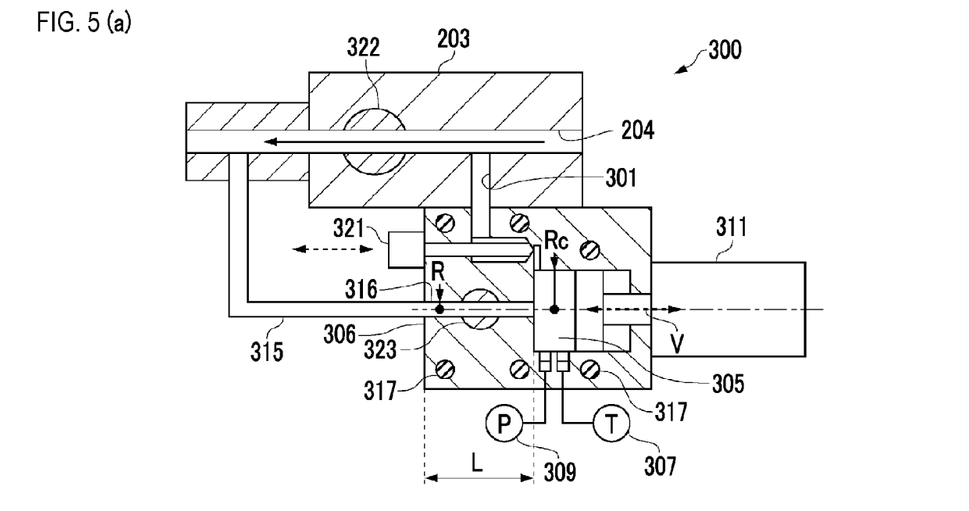
FIG. 5(a) illustrates a state where measurement is not performed.
FIG. 5(b) illustrates a state where measurement is performed.

The injection molding machine 2 according to this embodiment further includes a measuring unit 300 (FIGS. 5(a)-5(b)) in addition to the elements of the injection molding machine 1 of the first embodiment and the second embodiment. In addition, the operation of the measuring unit 300 can be controlled by the controller 50.

The plasticization process and the injection process in the injection molding machine 2 are the same as those of the first embodiment and the second embodiment, and thus differences from the first embodiment and the second embodiment will be mainly described.

As illustrated in FIGS. 5(a)-5(b), the measuring unit 300 is used to measure the amount of the reinforcing fiber (the fiber content) contained in the molten resin which reaches the discharge nozzle 203. The measuring unit 300 is provided in the vicinity of the discharge nozzle 203 of the plasticizing unit 200.

The measuring unit 300 includes a branch passage 301 which branches off from a discharge passage 204 in the discharge nozzle 203, an on-off valve 321 provided on the branch passage 301, a resin reservoir 305 which temporarily stores the molten resin that flows thereinto through the branch passage 301, a thermometer 307 and a manometer 309 which measure the temperature and the pressure of the molten resin stored in the resin reservoir 305, and an actuator 311 which applies a pressure to the molten resin stored in the resin reservoir 305. In addition, the specific form of the measuring unit 300 is not limited to the above description, and other forms may be employed as long as a pressure P1 of the molten resin M can be measured.

In the discharge passage 204, an on-off valve 322 is provided closer to the downstream side in the flow direction of the molten resin than the branch portion of the branch passage 301. In addition, one end of a return passage 315 is connected to the resin reservoir 305, and the other end of the return passage 315 is connected to the discharge passage 204 of the discharge nozzle 203. The other end of the return passage 315 is connected to the discharge passage 204 on a side closer to the downstream side than the on-off valve 322. An on-off valve 323 is provided in the return passage 315. An inner portion of a resin accumulation block 306 in the return passage 315 forms a throttle 316.

The on-off valves 321, 322, and 323 of the measuring unit 300, the thermometer 307, and the manometer 309 are connected to the controller 50.

The controller 50 transmits command signals for opening and closing to the values to the on-off valves 321, 322, and 323 depending on whether or not measurement is to be performed. The molten resin M is drawn into the resin reservoir 305 via the branch passage 301 of the measuring unit 300 by controlling the opening and closing of the on-off valves 321, 322, and 323. When the temperature and the pressure of the drawn molten resin M are measured by the thermometer 307 and the manometer 309, information regarding the measured temperature and pressure is transmitted to the controller 50. The controller 50 obtains fiber content on the basis of the acquired information regarding the temperature and the pressure.

When the fiber content is obtained, the molten resin which is stored in the resin reservoir 305 is returned to the discharge passage 204 through the return passage 315.

The fiber content can be obtained on the basis of the viscosity of the molten resin, for example, in the following manner.

The fiber content C of the molten resin and the viscosity η of the resin are proportional to each other.

On the other hand, the viscosity η can be obtained using the following Expression (1). In Expression (1), V, L, R, and Rc are known values excluding the pressure P1, and thus the viscosity η of the molten resin M can be obtained when the pressure P1 is measured. In addition, the velocity V is a constant velocity.

$$\text{Viscosity } \eta = (P1/V \cdot L) \times (R/Rc) \quad (1)$$

P1=the pressure (Pa) of the molten resin in the resin reservoir 305

V: the pushing speed V (mm/sec) of the actuator 311
L: the length (mm) of the throttle 316
Rc: the radius (mm) of the resin reservoir 305
R: the radius (mm) of the throttle 316

Therefore, when the relationship between the fiber content and the viscosity η in the resin supplied for the injection molding is obtained in advance and the viscosity η is measured by using the measuring unit 300, the fiber content C of the molten resin which is measured can be specified.

Figure 6A:
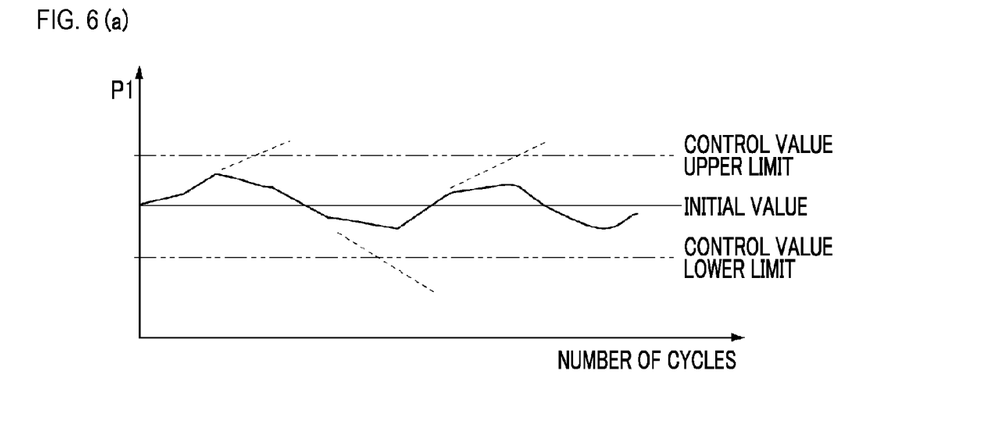
FIG. 6(a) illustrates pressure control information.
Figure 6B:
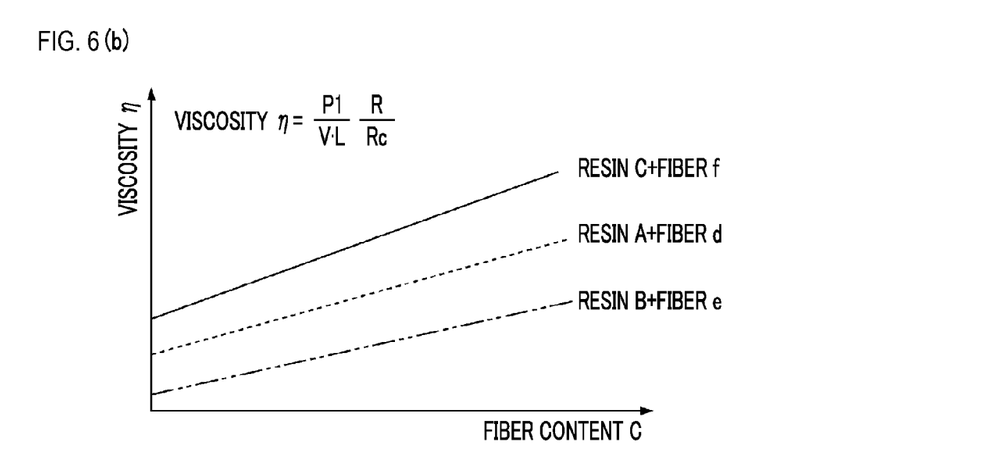
FIG. 6(b) illustrates fiber content-viscosity information.

For this, for example, information (content-viscosity information) illustrated in FIG. 6(b) in which the fiber content C and the viscosity η correspond to each other is experimentally obtained, and the content-viscosity information is stored in the controller 50 as a database.

When the pressure P1 measured by the manometer 309 is acquired, the controller 50 collates the pressure P1 with the content-viscosity information stored in the database thereof, and thus can obtain the fiber content C.

In FIG. 6(b), three types of content-viscosity information are shown as an example. The content-viscosity information changes due to the physical properties of a resin and the physical properties of reinforcing fiber, and thus the content-viscosity information is set according to the combination of resins (A, B, C) and fiber (d, e, f).

The viscosity η also changes due to the temperature of the resin. Therefore, the temperature needs to be specified for the content-viscosity information, and the controller 50 also stores information regarding the temperature (measurement temperature T) along with the content-viscosity information. On the other hand, in order to maintain the molten resin stored in the resin reservoir 305 at the measurement temperature T, the measuring unit 300 is provided with a heater 317 in the vicinity of the resin reservoir 305. The controller 50 collates the temperature information acquired by the thermometer 307 with the measurement temperature T, and adjusts heating of the molten resin through the heater 317 as necessary.

Subsequently, the sequence of the measurement of the fiber content C will be described.

When the measurement of the fiber content C is not performed, as illustrated in FIG. 5(a), the measuring unit 300 controls the opening and closing of the on-off valves 321 to 323 as follows. Therefore, the molten resin M is not accumulated in the resin reservoir 305.

[During Non-Measurement]
On-off valve 321: opened (ON)
On-off valve 322: closed (OFF)
On-off valve 323: closed (OFF)

When the measurement is performed, as illustrated in FIG. 5(b), the measuring unit 300 controls the opening and closing of the on-off valves 321 to 323 as follows.

[During Measurement]
On-off valve 321: closed (OFF)
On-off valve 322: opened (ON)
On-off valve 323: closed (OFF)

Since the on-off valves 321 to 323 are controlled as described above, the molten resin M flows from the discharge passage 204 into the resin reservoir 305 through the branch passage 301. When the resin reservoir 305 is filled with a predetermined amount of the molten resin M, the actuator 311 is operated at a predetermined velocity V to apply a pressure to the molten resin M of the resin reservoir 305. Simultaneously with the operation of the actuator 311, the on-off valve 323 is opened and the molten resin M is pushed out from the resin reservoir 305. In this procedure, the pressure P1 measured by the manometer 309 is acquired by the controller 50, and the controller 50 stores the pressure P1 and obtains the fiber content C as described above. The molten resin M which is pushed out is returned to the discharge passage 204 through the return passage 315. Thereafter, as illustrated in FIG. 5(a), the on-off valve 321 is opened, and the on-off valve 322 is closed. In this manner, preparation for transition to the injection process is made.

When the injection process ends, a holding process and a molded product ejecting process are performed, and then the next injection molding cycle is performed. Even after the next cycle, the measurement of the pressure (fiber content) in the plasticization process and the reverse rotation of the screw 10 in the injection process are similarly performed.

The controller 50 stores the pressure P1 in every cycle, and compares the pressure P1 to pressure control information illustrated in FIG. 6(a). The controller 50 instructs the fiber-supplying device 213 to adjust the supply amount of the reinforcing fiber F so that the acquired pressure P1 does not deviate from the pressure control information. The pressure control information includes a control value upper limit and a control value lower limit, and when the pressure P1 approaches the control value upper limit or the control value lower limit, in response to this, the supply amount of the reinforcing fiber F is increased or reduced in the next injection molding cycle. Accordingly, the fiber content C of the molten resin M can be monitored during the molding operation and can be controlled to be in a predetermined range in every molding cycle. Therefore, variation in the quality of the molded product can be reduced.

While the present invention has been described with reference to the exemplary embodiments thereof, the configurations exemplified in the embodiments may be selected or may also be appropriately changed to other configurations without departing from the gist of the present invention.

For example, the rotation of the screw during the injection process is not limited to the reverse rotation, and even when the rotation is normal rotation, the phase of the groove region positioned on the lower side of the screw can be substituted with a position opposing the vent hole 206. Therefore, the effect of reducing the region which is not filled with the reinforcing fiber F can be obtained as in the above-described embodiments.

However, in the case of the reverse rotation in the injection process, the molten resin M in the groove of the tip end portion of the screw 10 is transported to flow backward toward the rear side due to the reverse rotation of the screw 10, and thus the pressure of the molten resin M of the tip end portion of the screw 10 is reduced. At this time, depending on the type of the resin or conditions for the reverse rotation, there may be a case where bubbles are generated in the molten resin M and appear on the surface of the molded product, resulting in molding defects. However, in a case where the screw 10 is rotated in the normal direction during the injection process, an effect of filling the inside of the groove of the screw 10 on the lower side of the vent hole 206 with the reinforcing fiber F can also be obtained without reducing the pressure of the tip end portion of the screw 10.

In addition, in a case where the closing of the check value (not illustrated) provided in the tip end portion of the screw 10 is delayed by an increase in the pressure of the molten resin M in the tip end portion of the screw 10 due to the normal rotation of the screw 10, it is thought that it is effective to delay the start of the normal rotation from the start of the advance of the screw 10. To control the delaying of the start of the normal rotation of the screw 10, detection of the end of measurement by a timer, reaching a predetermined value by the advance amount of the screw 10, or reaching a predetermined value by the electric motor torque or the hydraulic pressure for the injection, and the like are considered.

In the plasticizing unit 200 of this embodiment, the fiber-supplying device 213 and the resin-supplying hopper 207 are fixed to the heating cylinder 201. However, a movable hopper which moves in the axial direction of the screw 10 may be employed. Particularly, in the case of using a multiple axis type metering feeder in the fiber-supplying device 213, a plurality of feeders may be connected to be arranged in parallel in the longitudinal direction of the screw 10, and the feeders may be switched therebetween to supply the reinforcing fiber F in the plasticization process for use. Specifically, at the start of the plasticization process, the reinforcing fiber F is supplied from the feeder disposed on the tip end side of the screw 10, and as the screw 10 retracts during the plasticization process, the feeders that supply the reinforcing fiber F may be sequentially switched in the rearward direction so that the relatively position of the screw 10 to the feeder screw from which the fiber is discharged is not changed. Accordingly, regardless of a change in the relative position of the screw 10 to the heating cylinder 201 due to the retraction of the screw 10 and the advance of the screw 10 during the injection, the position at which the reinforcing fiber F is supplied with respect to the screw 10 is allowed to be constant. Specifically, the position of the fiber supply feeder screw, that is, the position of the screw groove of the rearmost portion which is filled with the reinforcing fiber F when the plasticization is completed is allowed to coincide with the position of the fiber supply feeder screw at the start of the subsequent plasticization at the position of the screw which advances due to the injection. Therefore, the reinforcing fiber F can be continuously supplied to the screw groove positioned closer to the front side than the fiber-supplying device 213, and thus this is effective in preventing or suppressing the generation of the region which is not filled with the reinforcing fiber F in the groove of the screw 10 positioned closer to the front side than the fiber-supplying device 213. In addition, as a method of switching the feeder screws, simple ON/OFF control may be employed, or the number of rotations of the adjacent screw feeders may be changed in cooperation with each other. Specifically, as the screw retracts, the number of rotations of the screw feeder on the front may be gradually reduced while the number of rotations of the screw feeder on the rear side may be gradually increased.

In addition, in this embodiment, the screw 10 is described as a two stage type. However, a one stage type screw form may be employed in a case where gaps which can be filled with the reinforcing fiber F can be provided in the groove of the screw 10 by limiting the supply amount of the resin pellets P supplied from the resin-supplying hopper 207 when the molten resin M transported from the resin-supplying hopper 207 into the screw 10 or a semi-molten resin containing a resin in a non-molten state reaches the fiber-supplying device 213. In addition, a view in which a mixer is provided in the tip end portion of the screw 10 is illustrated. However, in a case where the reinforcing fiber F is easily broken, the mixer may not be provided.

In addition, the resin and the reinforcing fiber applied to the present invention are not particularly limited, and widely include well-known materials including a general-purpose resin such as polypropylene or polyethylene, a well-known resin such as an engineering plastic including polyamide and polycarbonate, a well-known reinforcing fiber such as glass fiber, carbon fiber, bamboo fiber, linen fiber, and the like.

The invention claimed is:
1. An injection molding method which includes a cylinder having a discharge nozzle formed on a front side thereof, a single axis screw provided to be rotatable in the cylinder, and a fiber-supplying device for filling the cylinder with reinforcing fiber, and performs injection molding while separately supplying the reinforcing fiber and a resin starting material and supplying the reinforcing fiber on a side closer to the front side than the resin starting material, the method comprising:
   a plasticization process of allowing the screw to retract while rotating the screw in a normal direction to melt the resin starting material and kneading the reinforcing fiber with the melted resin starting material, thereby obtaining a predetermined amount of a kneaded product; and
   an injection process of discharging the kneaded product from the discharge nozzle by allowing the screw to advance,
   wherein the reinforcing fiber is supplied into the cylinder in the injection process,
   wherein the screw is rotated in the normal direction or is rotated in a reverse direction in the injection process,
   wherein the cylinder is provided with a vent hole which penetrates through a body of the cylinder from an outer peripheral surface to an inner peripheral surface thereof in order to supply the reinforcing fiber from the side closer to the front side than the resin starting material, and and wherein, in the injection process, a reverse rotational velocity of the screw is set so that movement of the flight of the screw in a projection region of the vent hole is equal to or smaller than one lead length of the flight.

2. The injection molding method according to claim 1, wherein, in the injection process, the screw is rotated in the reverse direction at the same velocity as in the plasticization process.

3. An injection molding device comprising:

a controller;

a cylinder having a discharge nozzle formed on a front side thereof;

a single axis screw provided to be rotatable in the cylinder;

a fiber-supplying device for filling the cylinder with reinforcing fiber;

a resin-supplying hopper which is provided closer to a rear side than the fiber-supplying device and supplies a resin starting material into the cylinder; and a vent hole which penetrates through a body of the cylinder from an outer peripheral surface to an inner peripheral surface thereof in order to supply the reinforcing fiber from the side closer to the front side than the resin starting material, wherein the injection molding device is configured to control the injection molding device to perform a plasticization process of allowing the screw to retract while rotating the screw in a normal direction to melt a resin starting material and kneading the reinforcing fiber with the melted resin starting material, thereby obtaining a predetermined amount of a kneaded product, and an injection process of discharging the kneaded product from the discharge nozzle by allowing the screw to advance, the injection molding device is configured to supply reinforcing fiber into the cylinder in the injection process, the screw is rotated in the normal direction or is rotated in a reverse direction in the injection process, and a reverse rotational velocity of the screw is set so that movement of a flight of the screw in a projection region of the vent hole is equal to or smaller than one lead length of the flight in the injection process.

4. The injection molding device according to claim 3, wherein, the injection molding device is configured to, in the injection process, rotate the screw in the reverse direction at the same velocity as in the plasticization process.

* * * * *